US012055896B2

(12) United States Patent
Mabillard et al.

(10) Patent No.: US 12,055,896 B2
(45) Date of Patent: Aug. 6, 2024

(54) FLEXIBLE MONOLITHIC COMPONENT FOR A TIMEPIECE

(71) Applicant: SA DE LA MANUFACTURE D'HORLOGERIE AUDEMARS PIGUET & CIE, Le Brassus (CH)

(72) Inventors: Yann Mabillard, Figino (CH); Stefano Bottinelli, San Pietro (CH); Tiavina Niaritsiry, Le Sentier (CH); Nicolas Burridge, Nyon (CH); Giulio Papi, La Chaux-de-Fonds (CH)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 1135 days.

(21) Appl. No.: 16/349,952

(22) PCT Filed: Dec. 19, 2017

(86) PCT No.: PCT/EP2017/083646
§ 371 (c)(1),
(2) Date: May 14, 2019

(87) PCT Pub. No.: WO2018/115014
PCT Pub. Date: Jun. 28, 2018

(65) Prior Publication Data

US 2019/0332061 A1 Oct. 31, 2019

(30) Foreign Application Priority Data

Dec. 23, 2016 (CH) ....................................... 1737/16

(51) Int. Cl.

| | |
|---|---|
| ***G04B 19/253*** | (2006.01) |
| ***G04B 5/18*** | (2006.01) |
| ***G04B 13/02*** | (2006.01) |

(52) U.S. Cl.
CPC ........... *G04B 19/253* (2013.01); *G04B 5/185* (2013.01); *G04B 13/02* (2013.01)

(58) Field of Classification Search
CPC ...... G04B 19/253; G04B 5/185; G04B 13/02; G04B 15/00; G04B 15/06; G04B 5/08
See application file for complete search history.

(56) References Cited

U.S. PATENT DOCUMENTS 6,059,481 A 5/2000 Genequand
6,283,666 B1 9/2001 Genequand
(Continued)

FOREIGN PATENT DOCUMENTS

CH 500 522 A 8/1970
CH 692 529 A5 7/2002
(Continued)

OTHER PUBLICATIONS

Drive—dictionary.com—Mar. 16, 2023.*

*Primary Examiner* — Renee S Luebke
*Assistant Examiner* — Matthew Hwang
(74) *Attorney, Agent, or Firm* — Christensen, Fonder, Dardi & Herbert PLLC

(57) ABSTRACT

A monolithic component for a timepiece, in particular for a mechanical timepiece, comprising at least one rigid portion and an elastically flexible portion and designed to transmit the movement of an actuator of the timepiece to a driven part of the timepiece. The monolithic component comprises a rigid frame, a first rigid driving member, and a first elastically flexible structure connecting said frame to said first driving member. The first elastically flexible structure is configured in a manner such as to provide a displacement of said first driving member with at least two degrees of freedom, said displacement being caused as a result of the actuator coming into contact with said first driving member.

15 Claims, 6 Drawing Sheets

(56) References Cited

U.S. PATENT DOCUMENTS

| | | | | |
|---|---|---|---|---|
| 9,075,394 | B2 * | 7/2015 | Stranczl | G04B 15/06 |
| 10,241,473 | B2 | 3/2019 | Hessler et al. | |
| 2011/0019506 | A1 | 1/2011 | Dehon | |
| 2011/0044139 | A1 | 2/2011 | Henein et al. | |
| 2012/0063273 | A1 | 3/2012 | Koda et al. | |
| 2012/0063274 | A1 | 3/2012 | Uchiyma et al. | |
| 2012/0082010 | A1 | 4/2012 | Boulenguiez et al. | |
| 2013/0176829 | A1 | 1/2013 | Cusin et al. | |
| 2013/0070570 | A1 * | 3/2013 | Colpo | G04B 15/14 29/896.3 |
| 2014/0133281 | A1 | 5/2014 | Stranczl et al. | |
| 2014/0286140 | A1 | 9/2014 | Stranczl et al. | |
| 2014/0286141 | A1 | 9/2014 | Stranczl et al. | |
| 2014/0286143 | A1 | 9/2014 | Stranczl et al. | |
| 2014/0286145 | A1 | 9/2014 | Stranczl et al. | |
| 2014/0355396 | A1 | 12/2014 | Fleury et al. | |
| 2014/0363217 | A1 | 12/2014 | Barrot et al. | |
| 2015/0043313 | A1 | 2/2015 | Stranczl et al. | |
| 2015/0063082 | A1 | 3/2015 | Stranczl et al. | |
| 2015/0168915 | A1 | 6/2015 | Fleury | |
| 2015/0212490 | A1 | 7/2015 | Cordier et al. | |
| 2015/0234354 | A1 | 8/2015 | Henein et al. | |
| 2015/0248112 | A1 | 9/2015 | Sranczl et al. | |
| 2015/0355599 | A1 | 12/2015 | Stranczl et al. | |
| 2016/0223989 | A1 | 8/2016 | Winkler et al. | |
| 2016/0252881 | A1 | 9/2016 | Stranczl et al. | |

FOREIGN PATENT DOCUMENTS

| | | | |
|---|---|---|---|
| CH | 703 464 | A2 | 1/2012 |
| CH | 703 772 | A2 | 3/2012 |
| CH | 703 779 | A2 | 3/2012 |
| CH | 705 674 | A2 | 4/2013 |
| CH | 705 967 | A1 | 7/2013 |
| CH | 705 968 | A1 | 7/2013 |
| CH | 705 969 | A1 | 7/2013 |
| CH | 705 970 | A1 | 7/2013 |
| CH | 705 971 | A1 | 7/2013 |
| CH | 706 274 | A2 | 9/2013 |
| CH | 706 908 | A2 | 3/2014 |
| CH | 706 924 | A2 | 3/2014 |
| CH | 707 171 | A2 | 5/2014 |
| CH | 707 187 | A2 | 5/2014 |
| CH | 707 808 | A2 | 9/2014 |
| CH | 707 810 | A2 | 9/2014 |
| CH | 707 811 | A2 | 9/2014 |
| CH | 707 814 | A2 | 9/2014 |
| CH | 707 815 | A2 | 9/2014 |
| EP | 0 840 023 | A1 | 5/1998 |
| EP | 0 857 891 | A1 | 8/1998 |
| EP | 1 084 459 | | 3/2001 |
| EP | 1 306 733 | A2 | 5/2003 |
| EP | 1 736 838 | A1 | 12/2006 |
| EP | 2 037 335 | A2 | 3/2009 |
| EP | 2 105 806 | A1 | 9/2009 |
| EP | 1 812 829 | B1 | 7/2010 |
| EP | 2 273 323 | A2 | 1/2011 |
| EP | 2 290 476 | A1 | 3/2011 |
| EP | 2 437 126 | A1 | 4/2012 |
| EP | 2 613 205 | A2 | 7/2013 |
| EP | 2 645 189 | A1 | 10/2013 |
| EP | 2 660 661 | A2 | 11/2013 |
| EP | 2 703 911 | A1 | 3/2014 |
| EP | 2 706 416 | B1 | 3/2014 |
| EP | 2 730 980 | A1 | 5/2014 |
| EP | 2 781 965 | A1 | 9/2014 |
| EP | 2 781 966 | A1 | 9/2014 |
| EP | 2 781 967 | A1 | 9/2014 |
| EP | 2 781 969 | A1 | 9/2014 |
| EP | 2 781 970 | A1 | 9/2014 |
| EP | 2 844 345 | A2 | 6/2015 |
| EP | 2 887 151 | A2 | 6/2015 |
| EP | 2 894 521 | A1 | 7/2015 |
| EP | 2 908 184 | A1 | 8/2015 |
| EP | 2 911 012 | A1 | 8/2015 |
| EP | 2 977 830 | A1 | 1/2016 |
| EP | 3 032 351 | A1 | 6/2016 |
| EP | 3 054 358 | A1 | 8/2016 |
| JP | S52-139468 | A | 11/1977 |
| JP | 2008-197036 | A | 8/2008 |
| JP | 2015-511714 | A | 4/2015 |
| WO | WO 2011/120180 | A1 | 10/2011 |
| WO | WO 2012/010408 | A1 | 1/2012 |
| WO | WO 2013/093108 | A1 | 6/2013 |
| WO | WO 2013/102600 | A2 | 7/2013 |
| WO | WO 2015/104692 | A2 | 7/2015 |

* cited by examiner

FLEXIBLE MONOLITHIC COMPONENT FOR A TIMEPIECE

PRIORITY CLAIM

The present application is a National Phase entry of PCT Application No. PCT/EP2017/083646, filed Dec. 19, 2017, which claims priority from Swiss Patent Application Number 01737/16, filed Dec. 23, 2016, the disclosures of which are hereby incorporated by reference herein in their entirety.

FIELD OF THE INVENTION

The present invention relates to a monolithic component for a timepiece, in particular for a mechanical timepiece, designed to transmit the movement of an actuator of the timepiece to a driven part of the timepiece.

BACKGROUND OF THE INVENTION

In this context, the patent application WO 2012/010408 discloses oscillating mechanisms with an elastic pivot and mobile elements for transmitting energy comprising oscillating mechanisms of that type, which are intended to replace a balance wheel, respectively a conventional escapement, such that a regulating member is realized with the aid of monobloc components.

The patent application EP 1 306 733 discloses a control member of which at least two portions which are produced as a single part, but which also comprises other articulated parts which are not all located in the same plane.

The Japanese patent JP 4 917 909 presents a jumper constituted by a base fixed to a bridge and a rigid extremity acting as an indexing point, with two elastic arms acting as a link between the base and the indexing point, the jumper allowing to secure the position of a toothed ring.

SUMMARY OF THE INVENTION

The aim of the present invention is to reduce the number of components constituting a complete mechanism or a functional sub-assembly, with a view to reducing problems associated with friction and with the play between these components constituting a conventional horological mechanism, to control the positions, and therefore to guarantee the reliability of the mechanism. More specifically, the aim of the invention is to provide functional monolithic components of the type defined in the introduction, which al low the transmission of energy by means of an actuation along trajectories with a variety of directions. A further aim of the invention is to propose monolithic components forming a constant force transmission member which allows to provide better reproducibility and a more secure actuation of the driven part. In addition, the invention aims to produce monolithic components of this type by means of fabrication techniques which are known in horological construction.

To this end, the present invention proposes monolithic components for a timepiece, in particular for a mechanical timepiece, comprising at least one rigid portion and an elastically flexible portion and designed to transmit the movement of an actuator of the timepiece to a driven part of the timepiece, said monolithic components comprising a rigid frame, a first rigid driving member, and a first elastically flexible structure connecting said frame with said first driving member, said first elastically flexible structure being configured in a manner such as to provide a displacement of said first driving member with at least two degrees of freedom, said displacement being caused as a result of a movement of the actuator.

Thus, the present invention proposes monolithic components formed by a plurality of rigid zones and flexible zones. The terms “rigid” and “flexible” as used here should be understood in the context of the horological field, i.e., that a flexible zone undergoes a flexion which is sufficient for the desired transmission of movement as a result of the mechanical force that the actuator is capable of producing, while in this situation, a rigid zone does not deform significantly.

In the context of the invention, the actuator may be a part that is independent of the monolithic component, coming into contact with said first driving member in order to generate said displacements. The actuator may also be integral with the monolithic component.

The components of said displacement with two degrees of freedom are selected from translations, rotations and combinations thereof.

The first elastically flexible structure may comprise two flexible strips each extending between said frame and said first driving member.

The points of contact of the two flexible strips with the first driving member may be arranged in different zones of said first (hiving member. One of the two said flexible strips may comprise an elbowed or bent portion angled substantially at a right angle.

An intermediate rigid portion may be arranged between two flexible portions of the flexible structure.

The first elastically flexible structure may also comprise one or more flexible necks arranged between two rigid elements of said monolithic component.

According to one embodiment of the invention, the monolithic component preferably comprises a second functional member and a second elastically flexible structure connecting said frame to said second functional member, said second elastically flexible structure being configured in a manner such as to place said second functional member in contact with a driven part.

According to one embodiment of the invention, said second functional member is a retaining member, configured to temporarily secure a part driven by said first driving member in its position.

In one application of the invention, said driven part is a toothed disc, the actuator is a control wheel equipped with a driving finger, said first driving member is a yoke, and said second functional member is a jumper.

In another application of the invention, the monolithic component constitutes an automatic winding mechanism, integrating an oscillating mass as the actuator, the driven part being an automatic winding wheel, and said first driving member comprising two fingers which both act in alternation as driving finger.

The components defined above are preferably produced from hardenable steels, also known as maraging steels, for example Durnico steel. Materials of this type, in sheets or thin plates, may be machined by wire cutting, by die stamping, or by femtoprinting in order to produce components which extend in a single plane.

The invention will now be described in detail with reference to the accompanying drawings which illustrate several embodiments of the invention, by way of example.

BRIEF DESCRIPTION OF THE DRAWINGS

The accompanying drawings schematically represent several embodiments of the invention, by way of example.

The same reference numerals and the same graphics (hatching, crosses, greyscale, etc.) are used throughout the figures in order to designate identical or similar elements.

DETAILED DESCRIPTION OF THE INVENTION

Figure 1:
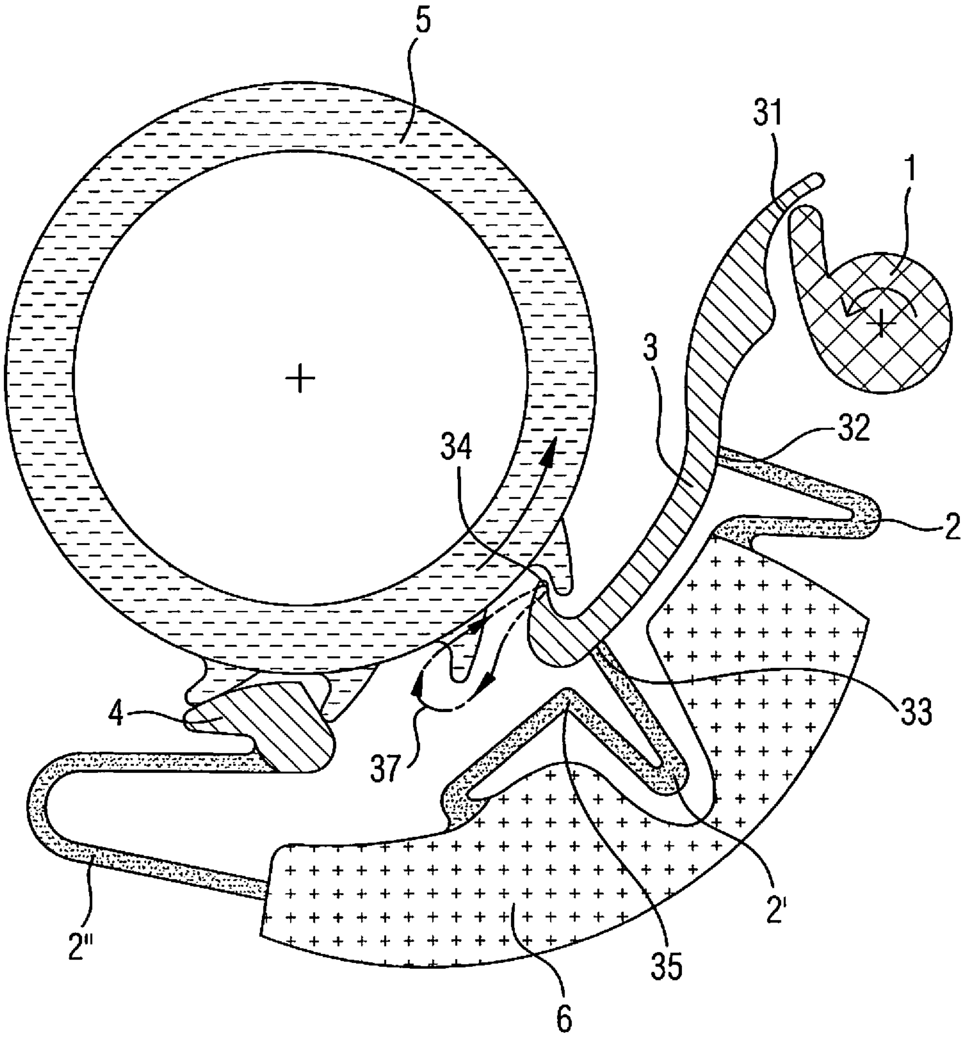
FIG. 1 is a schematic top view illustrating, by way of example, an actuator—monolithic component—driven part kinematic chain realized using a monolithic component according to the present invention.

FIG. 1 shows an actuator—monolithic component—driven part kinematic chain schematically illustrating the inventive concept by way of example. This chain comprises an actuating finger 1, a monolithic component according to the invention and a driven part 5 which may, for example, consist of a toothed wheel or of a toothed ring/disc. The monolithic component comprises several portions, namely a first rigid driving member 3, a second rigid functional member 4, namely, in the embodiment illustrated in FIG. 1 by way of example, a retaining member 4, a rigid frame 6, a first elastically flexible structure—comprising in the embodiment illustrated in FIG. 1 by way of example two flexible strips 2, 2'—which connects the first rigid driving member 3 to the frame 6, and a second elastically flexible structure—constituted in the embodiment illustrated by way of example in FIG. 1 by a flexible strip 2"—which connects the second functional member 4, in the example illustrated the retaining member 4, to the frame 6. The frame 6 is the portion of the monolithic component according to the present invention allowing to attach it to the timepiece, normally to a bridge of this timepiece, into which the monolithic component is to be integrated. While the monolithic component necessarily comprises a first rigid driving member 3 attached to the rigid frame 6 via said first elastically flexible structure 2, 2', the presence of a second rigid functional member 4 attached to the rigid frame 6 via a second elastically flexible structure 2" is merely optional.

During the operation of the respective timepiece incorporating a kinematic chain as illustrated in FIG. 1, the actuating finger 1, fixed to a control wheel mounted in a rotatable manner in said timepiece, slides on a suitable portion 31 of the first rigid driving member 3 during the progressive rotation of said control wheel, generating a displacement of the driving member 3 controlled by the first elastically flexible structure, i.e., in the example illustrated in FIG. 1 by the two strips 2, 2', and limited by contact of said first driving member 3 with the driven wheel 5. The person skilled in the art will observe that the end of the rigid driving member 3 in the shape of a hook constitutes a driving means or mechanism 34 adapted to engage with the teeth of the driven wheel 5 in order to drive it. The driving means 34 executes a displacement with a component which is parallel to the circumference of said driven wheel 5 and a component which is perpendicular to said circumference. Thus, the whole of the first driving member 3 executes an alternating oscillating movement in two dimensions. This movement is possible because of the elastic deformation of the strips 2, 2' of the first elastically flexible structure and, when the driving means 34 is engaged in the teeth of the driven wheel 5, causes the rotation of the driven wheel 5 in the direction of the arrow indicated in FIG. 1. In the example of FIG. 1, the displacement of the driven part 5 is a rotation, but it could also be pivoting, a translation, or any other displacement depending on the specific application for which the monolithic component according to the present invention is used. In the case in which the second functional member, as in the example illustrated in FIG. 1, constitutes a retaining member 4, the elastic contact of this retaining member 4 with the driven wheel 5 secures, outside the drive phases of the driven wheel 5 by the first rigid driving member 3, this driven wheel 5 against any inadvertent rotation. Furthermore, the function of the second functional member 4 may, in general, consist of a function other than maintaining a given part of the respective timepiece, this part also not necessarily being the part 5 driven by the first rigid driving member 3, but may also be another portion of this timepiece.

As a consequence, a kinematic chain as shown by way of example in FIG. 1 may be realized with the aid of a monolithic component according to the present invention, by using a maximum of three physically separate parts, namely the actuator, the monolithic component and the driven part. In this context, it remains to note that the principle illustrated by means of the example of FIG. 1 may be embodied in a multitude of variations, in particular by modifying the arrangement of the first elastically flexible structure and/or of the second elastically flexible structure as well as, as an alternative or in addition, the function and/or the arrangement of the first rigid driving member and/or of the second functional member.

FIGS. 2*a* to 2*h* are schematic views illustrating the inventive concept of guiding with several degrees of freedom by means of a linkage via an elastically flexible structure 2, 2', in particular via several flexible strips, between a rigid frame 6 and a rigid functional member 3. Eight embodiments of a monolithic component with flexible strips are shown therein, in these cases with a single functional member, in order to demonstrate, by way of example, at least a portion of the multitude of potential variations that could be realized, it being understood that it is not possible here to describe all of the variations which could be realized. The frames 6 are represented with crosses, while the functional organs 3 are represented with hatching, and the strips 2, 2' of the elastically flexible structures are not hatched because they are fairly thin, the rigid intermediate portions 7 which could form part of the elastically flexible structures—as indicated schematically in FIGS. 2*c* and 2*h*—are in grayed. The rigid intermediate portions 7 are zones of the monolithic component which are much thicker than the zones constituting the flexible strips 2, 2'. In order to simplify the figures, the actuator, respectively the actuating finger 1, which will come into contact with the rigid functional member 3, preferably at the end of the functional member 3 opposite to its end in the shape of a hook engaging in the driven part 5 and thus acting as a driving finger, but which could also come into contact with a rigid intermediate portion 7 of an elastically flexible structure, as well as the driven part 5 are not shown in the figures. Arrows symbolise the displacements of the functional member 3, and in particular of its driving finger, as predefined by the corresponding elastically flexible structure.

Figure 2A:
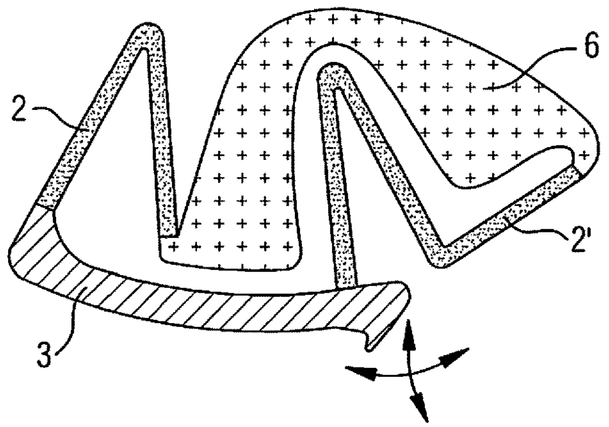
FIGS. 2*a* to 2*h* are schematic views showing eight embodiments of a monolithic component having flexible strips according to the present invention.
Figure 2B:
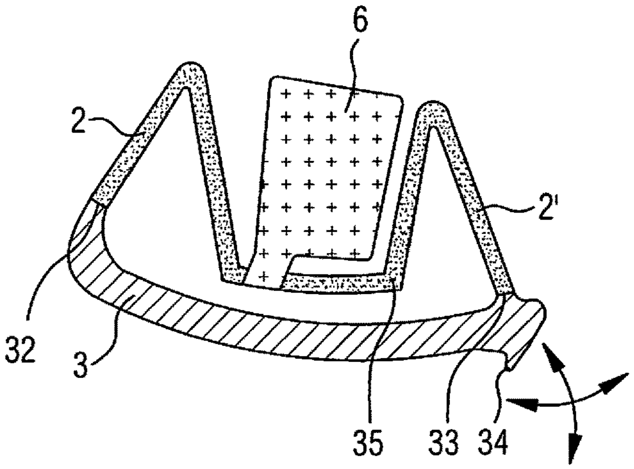
Figure 2C:
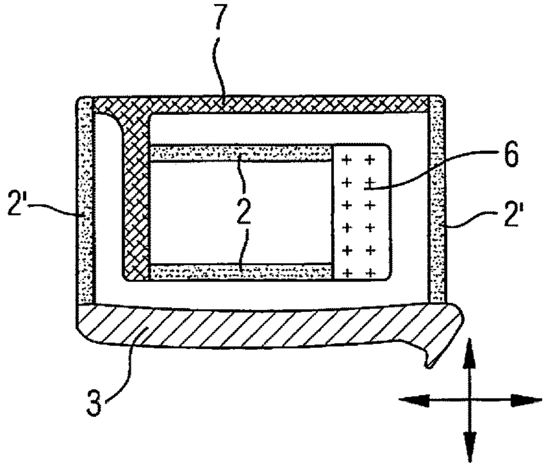
Figure 2D:
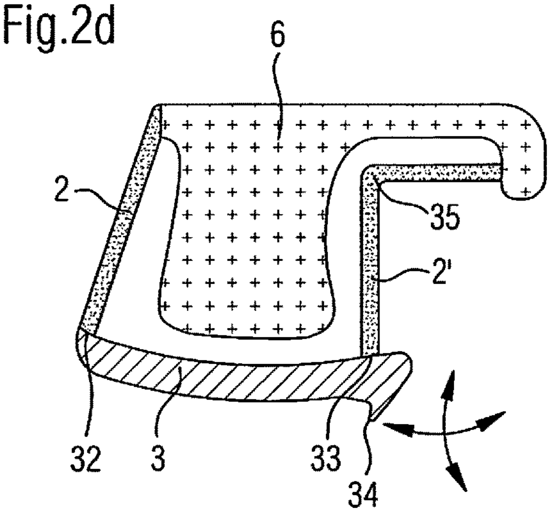
Figure 2E:
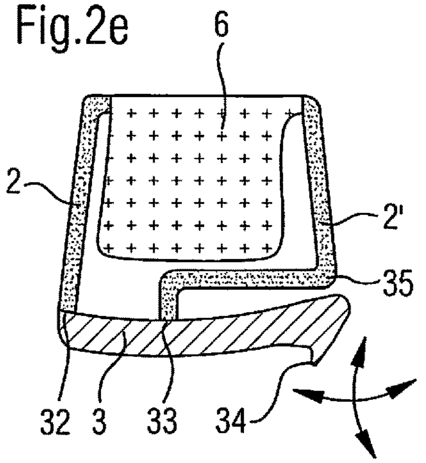
Figure 2F:
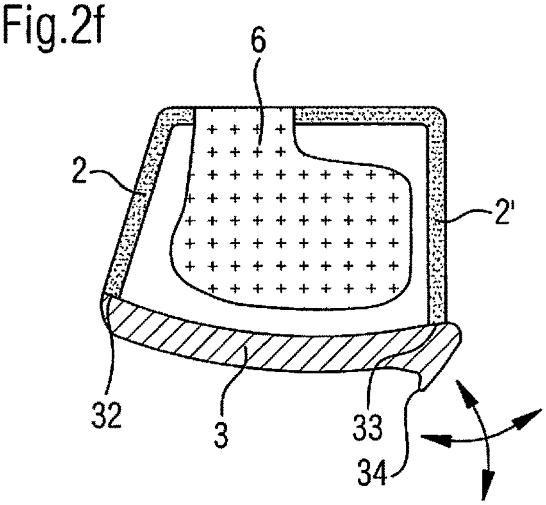
Figure 2G:
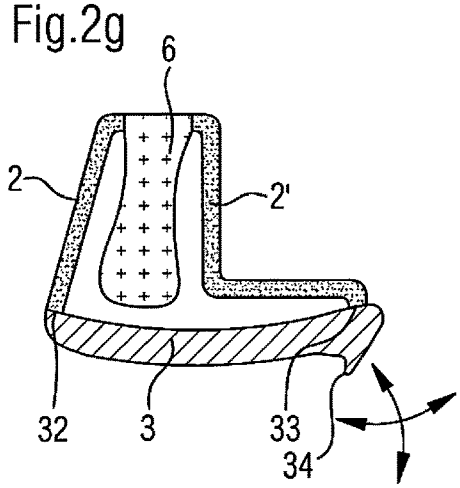
Figure 2H:
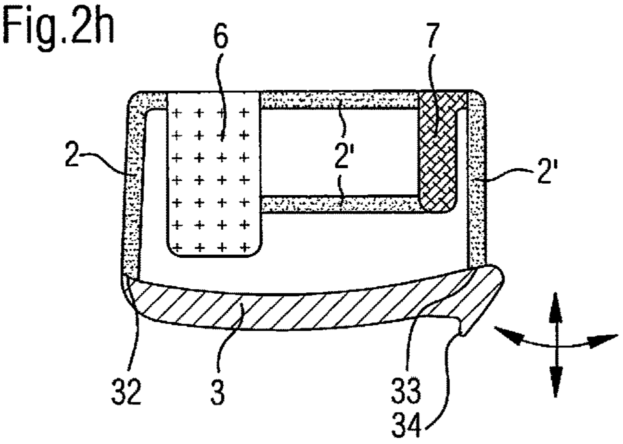

Upon examining these figures, the person skilled in the art will readily understand that the arrangement of an elastically flexible structure—comprising at least two flexible strips 2, 2' as well as, optionally, at least one rigid intermediate portion 7—between the rigid frame 6 and the functional member 3 allows a predefined displacement with at least two degrees of freedom of this latter. The person skilled in the art will in particular note that the presence of at least one bent or elbowed portion forming an angle of approximately 90° in at least one of the flexible strips 2, 2' of the elastically flexible structure allows, respectively considerably increases, the freedom of movement of the functional member 3 in one of the directions of its displacement. As an example, the flexible strip 2' in the embodiments of a monolithic component according to FIGS. 2*a*, 2*b*, 2*d*, 2*e*, 2*f* and 2*g* forms an elbowed portion of approximately 90°. Thus, considering the plane of the drawing in this figures as the reference system, the functional member 3 of the corresponding monolithic component may not only carry out a displacement in a substantially horizontal direction in this plane but, because of this elbowed portion, may also carry out a displacement in a substantially vertical direction in this plane. As can be seen in FIGS. 2*a*, 2*b*, 2*d*, 2*e*, 2*f* and 2*g*, the elbowed portion of approximately 90° is preferably formed on the flexible strip 2' located towards the end of the functional member 3 in the shape of a hook engaging in the driven part 5 and thus acting as the driving finger. It is also possible for an elastically flexible structure to form an elbowed portion of approximately 90° by interposing at least one rigid intermediate portion 7, as illustrated in FIGS. 2*c* and 2*h*. In the embodiments illustrated in these figures, the flexible strip 2' comprises several flexible portions orientated perpendicular with respect to each other and separated by a rigid intermediate portion 7. In this case too, the flexible strip 2', which is formed by a plurality of portions separated by a rigid intermediate portion 7 in order to form an elbowed portion of approximately 90°, is preferably located towards the end of the functional member 3 in the shape of a hook engaging in the driven part 5 and thus acting as a driving finger. Furthermore, FIGS. 2*c* and 2*h* show that a flexible strip 2' or 2 as well may be fixed either directly to the rigid frame 6 or to the intermediate rigid portion 7.

FIGS. 2*a* to 2*h* also indicate, in a schematic manner with the aid of arrows and by way of example, the types of combinations of movements that can be realized by a monolithic component according to the present invention which ensures guiding, with at least two degrees of freedom, of a rigid functional member by means of a linkage via an elastically flexible structure, in particular via at least two flexible strips, between a rigid frame and this rigid functional member. In particular, FIGS. 2*a*, 2*b*, 2*d*, 2*e*, 2*f* and 2*g* show a monolithic component the first elastically flexible structure of which comprises flexible strips 2, 2' configured in a manner such as to provide a displacement of said first driving member 3 with at least two degrees of freedom, i.e., of the functional member, the predefined two degrees of freedom of movement of the functional member 3 consisting of a rotation combined with a movement according to a "remote centre of compliance" (RCC). FIGS. 2*c* and 2*h* show a monolithic component wherein the first elastically flexible structure comprises flexible strips 2, 2' configured in a manner such as to provide a displacement of the functional member 3 with at least two degrees of freedom, the predefined two degrees of freedom of movement of the functional member 3 consisting of two combined translations, respectively of a translation combined with a movement according to a remote centre of compliance. Clearly, other configurations may be envisaged, in particular combinations of the configurations described above.

Figure 3:
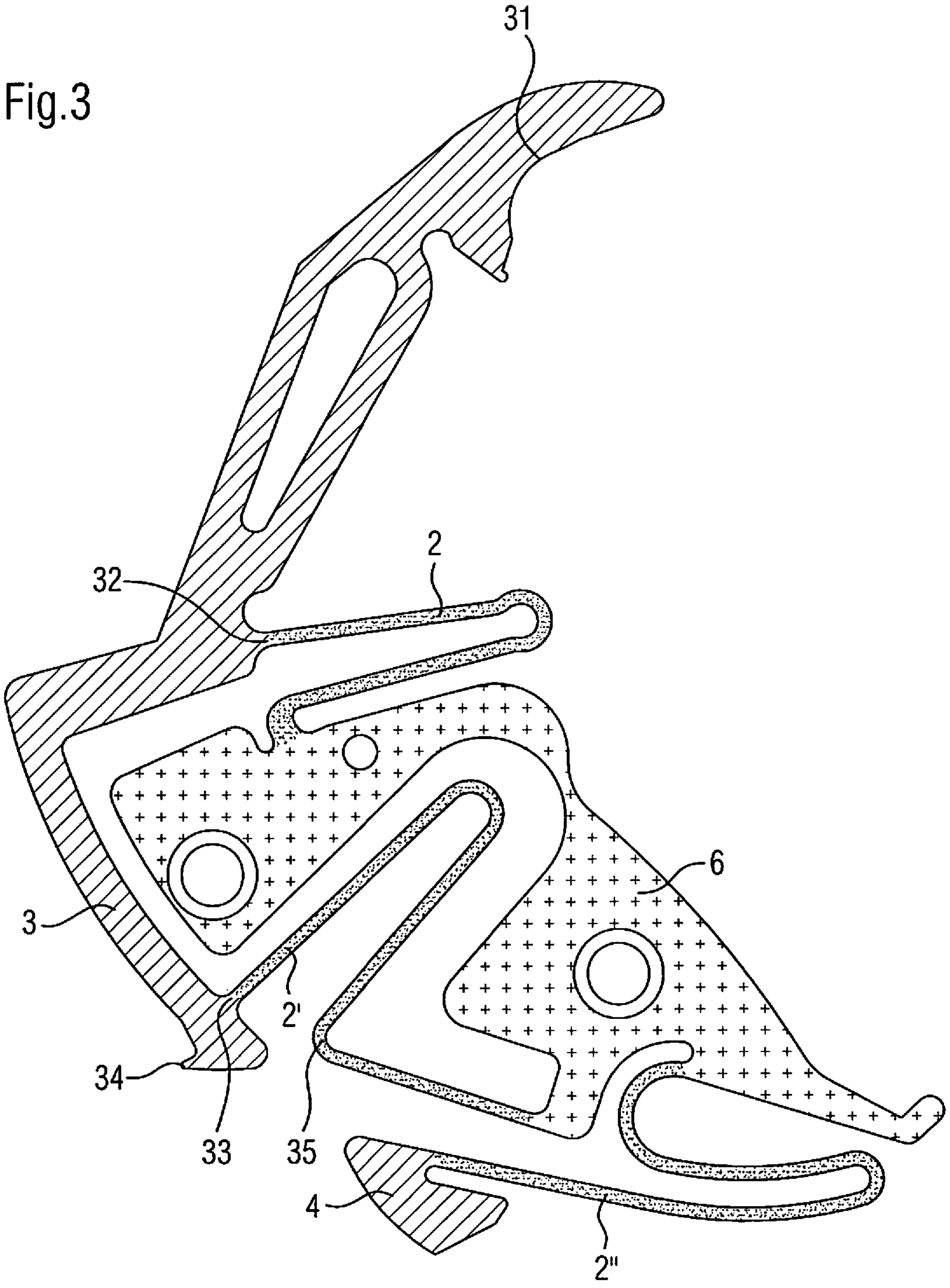
FIG. 3 shows a monolithic component according to the present invention which is adapted to be integrated into an instantaneous date mechanism.
Figure 4A:
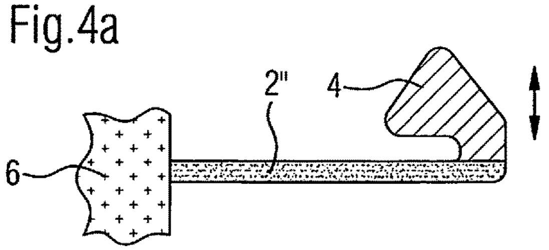
FIGS. 4*a* to 4*f* are schematic views showing six embodiments of a retaining member with its flexible structure which may form part of a monolithic component according to the present invention.
Figure 4B:
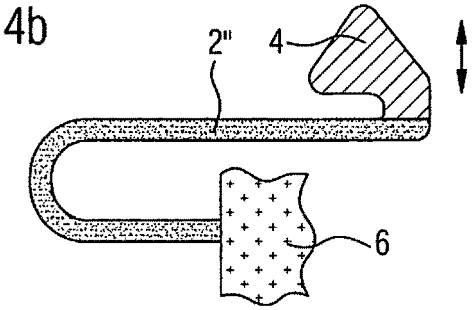
Figure 4C:
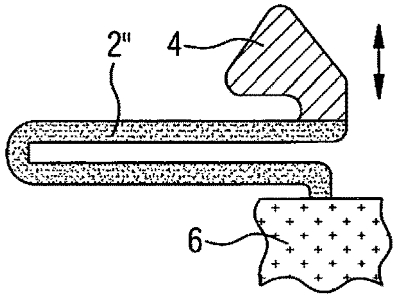
Figure 4F:
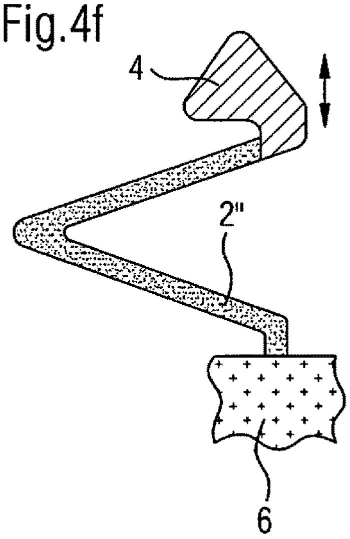
Figure 4D:
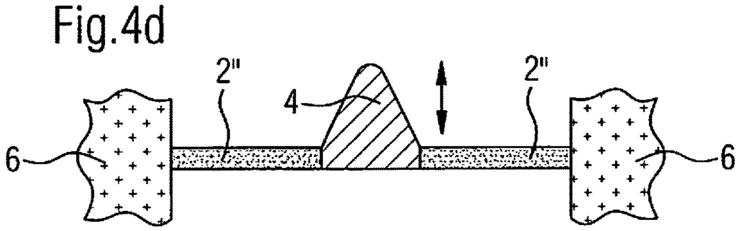
Figure 4E:
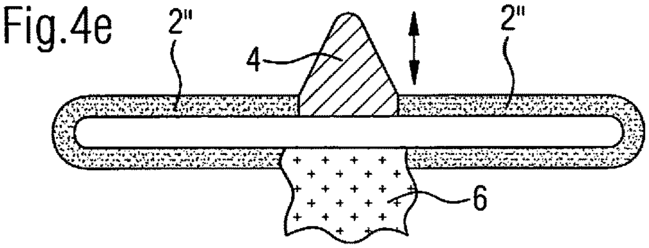

FIG. 3 shows a monolithic component according to the present invention which is adapted to be integrated into an instantaneous date mechanism of a corresponding timepiece. This component is intended to be interposed into a kinematic chain such as that shown in FIG. 1. The reference numerals and graphics are the same as above, as well as the structure and operation of the device, respectively of the kinematic chain, as explained in the context of FIG. 1. In particular, in this application of a monolithic component according to the present invention, said driven part, not illustrated in FIG. 3, is a date disc/ring, preferably having teeth on its internal periphery, the actuator is a control wheel equipped with an actuating finger, also not illustrated in FIG. 3, said first driving member 3 is formed by a driving yoke one end of which is adapted to be actuated by said actuating finger and the other end of which, equipped with a driving finger, is adapted to be engaged in the teeth of said date ring in order to drive it step by step, and said second functional member 4 is a jumper that is adapted to secure said date ring in its position, outside the times of actuation of this ring by the first driving member 3. Thus, this monolithic component acts as a driving member and securing member for a date disc/ring. It remains to be noted in this context that a functional member, in particular said second functional member acting as the jumper 4, may have two functions, given that, during a lapse of time during the operation of the mechanism, this retaining element may become a driving element. The general arrangement, respectively the operation of an instantaneous date mechanism is known to the person skilled in the art and will therefore not be described at this place, because the description shall be restricted to the monolithic component according to the present invention. Thus, the monolithic component shown in FIG. 3 allows by itself to replace more than ten parts, including pinions and arbors, normally used in the construction of a prior art date mechanism.

Figure 6:
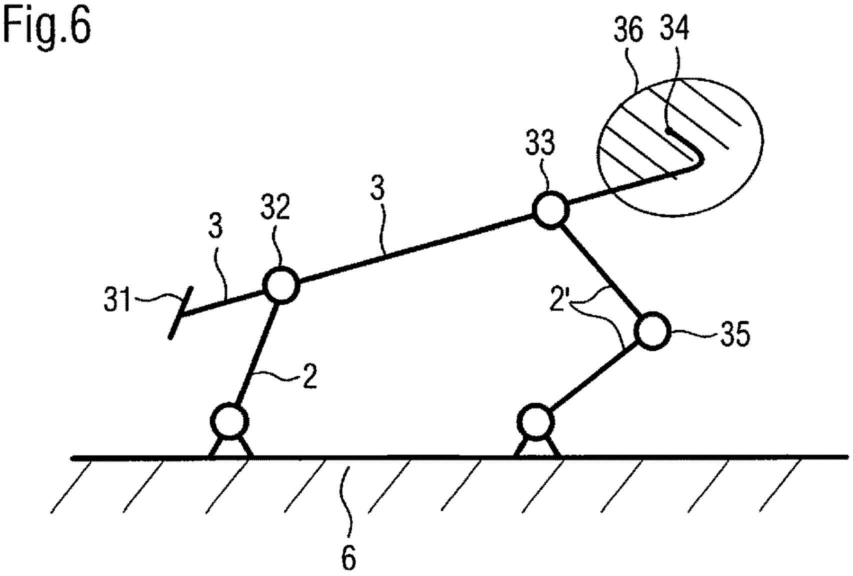
FIG. 6 shows a kinematic diagram for the embodiments of a monolithic component according to the present invention shown in FIGS. 1, 2 and 3.

FIG. 6 represents a kinematic diagram of principle for a monolithic component according to the invention, in which the flexible strips 2, 2' have been replaced by rigid elements articulated at their ends via pivot connections. This component extends in a working plane which is that of FIGS. 1 to 3. The kinematic diagram of FIG. 6 corresponds to the embodiments presented in FIGS. 1 to 3 with the exception of FIG. 2*c* and will now be used to explain in a more general manner the operation of the portions of a monolithic component according to the present invention.

Thus, in general, the first elastically flexible structure of a monolithic component according to the present invention comprises a first flexible strip 2 extending between the frame 6 and the driving member 3 and defining a first point of fixation 32 at the level of the driving member 3. This first point of fixation 32 is mobile with respect to the frame 6 according to a linear trajectory with one degree of freedom located in the working plane. This trajectory may be a circular arc as in FIG. 2*d*, 2*f*, 2*g*, 2*h* or 6. The shape of the flexible strip 2 may present two portions extending in substantially opposite directions such that the displacement of the point of fixation 32 is substantially rectilinear, as is the case with the exemplary embodiments shown in FIGS. 1, 2*a*, 2*h* and 3. Furthermore, the flexibility of the strip 2 means that the rigid driving member 3 is mobile in rotation with respect to the frame 6 about an axis perpendicular to the working plane.

In addition, the first elastically flexible structure of a monolithic component according to the present invention comprises a second flexible strip 2' defining a second point of fixation 33 at the level of the driving member 3. In the embodiments presented for example in FIGS. 1, 2*a* and 2*b*, the second flexible strip 2' comprises (amongst others) two portions extending in substantially perpendicular directions and connected together via an elbowed portion 35 shown symbolically in FIG. 6 by a pivot connection. Alternatively, the two portions of the second flexible strip 2' may be physically separated by a rigid intermediate portion 7, as in the configuration of FIG. 2*h*. The second point of fixation 33 is mobile with respect to the frame 6 in a flat trajectory with two degrees of freedom located in the working plane. Clearly, the invention is not limited to monolithic components wherein the second flexible strip 2' comprises two distinct portions separated by an elbowed portion or a rigid intermediate portion. The second flexible strip 2' may have any suitable kind of geometry such that the second strip 2' can flex to cause a displacement of the second point of fixation 33 in the working plane.

The first 32 and second 33 points of fixation of the first 2 and second 2' flexible strips in the first driving member 3 are arranged in different zones of said first driving member 3. Preferably, the distance of the points of fixation 32 and 33 represents at least a quarter of the length of the flexible strip 2. More specifically, separating the points of fixation 32, 33 means that the quadratic moment of the first flexible structure along an axis of the working plane can be substantially increased; in other words, guiding of the first driving member 3 in the working plane can be improved. Alternatively, for the same rigidity of the first driving member 3 in the working plane, separating the points of fixation 32, 33 means that the quadratic moment can be reduced, meaning that the section of each of the flexible strips can be reduced.

Preferably, the driving mechanism 34 is also separated from the point of fixation 32 so that its displacement occurs according to two degrees of freedom in the working plane. It is advantageous to provide abutments cooperating with the first driving member 3 and/or flexible arms 2, 2' in order to limit the deformation of the elastically flexible structure to within its elastic limits. The abutments may, for example, be integrated into the rigid frame 6. With or without abutments, the deformations of the flexible strips 2, 2' are limited and define a working zone 36 in which the driving means 34 is mobile, illustrated schematically in FIG. 6 by a hatched zone. The flexible strips 2, 2' exert an elastic restoring force which tends to return the driving means 34 to a rest position substantially at the centre of the working zone 36.

The actuator 1 acting on the adapted portion 31 of the first driving member 3 causes a displacement of the driving means 34 which describes a working trajectory 37 shown by way of example in FIG. 1. Preferably, the working trajectory 37 delimits a non-zero surface area by forming a loop, i.e., the return path towards the rest position is not superimposed on the outward path. This loop may be obtained in response to the displacement of the actuator 1 alone. The actuator 1 may, for example, be an eccentric guiding a circular displacement of the adapted portion 31, which will generate a working trajectory 37 in the form of a loop.

In other embodiments, the displacement of the driving member 3 is also brought about by the driven part 5. This is the case in the example of FIG. 1, where the driven part 5 deflects the outward path of the driving means 34, the driving means 34 sliding over a tooth of the driven part 5 until it overtakes the tooth, such that the driving means 34 can drive the tooth on the return path.

In still more embodiments, not shown, the displacement of the driving member 3 may also be brought about by a supplementary guide element intended to come into contact with the first driving member 3 being displaced under the action of the actuator. The supplementary guide element may be obtained from the frame 6 or be attached to a bridge, to the main plate or another element of the timepiece.

In general, the actuation of a mechanism by an actuating force which is susceptible to variations suffers from a number of disadvantages. This is the case, for example, when a user actuates a mechanism directly with the aid of a control member. The mechanism has to be dimensioned in order to withstand the strongest of actuations which may, for example result from a shock on a button. Furthermore, additional security devices eventually have to be provided in order to secure the position of moving parts.

The actuating force also varies when the actuator of the mechanism is driven by the energy source of the timepiece wherein the drive torque varies as a function of winding. In this second case, the operation of the mechanism has to be guaranteed over an extended range of actuating force which, in the case of positioning with a jumper, could complicate the design of the mechanism.

The present invention can overcome these disadvantages by proposing a monolithic component producing an actuating device with a constant force. The monolithic component according to the invention can be used to accumulate energy from the actuator as elastic energy and to restore it to the driven part with a constant force, independently of the actuating force of the actuator. In fact, driving of the driven part 5 is caused solely by the return of the driving means 34 to the rest position under the action of the flexible strips 2, 2'. The indirect transmission of the actuating force with the aid of the monolithic component of the invention thus allows to make the actuating mechanisms reliable and secure and to simplify their design.

FIGS. 4*a* to 4*f* are schematic views illustrating, with the same reference numbers and graphics as above in the context of FIG. 1, six embodiments of a second functional member 4, in particular of a retaining member such as used in the application illustrated in FIG. 3. This retaining member 4 is connected to a portion of a rigid frame 6 via a second elastically flexible structure, constituted by one or two strips 2". The person skilled in the art will readily understand, on looking at these figures, that the configuration of the flexible strip or strips 2" allows to displace the retaining member 4, forming a retaining finger, respectively a jumper 4, along the arrows indicated in these figures and symbolising the direction of the corresponding movement, in these cases corresponding to a translation. In particular, the flexible strip or strips 2" of a second elastically flexible structure in the embodiments of FIGS. 4*a* to 4*f* may be configured as a straight strip, in the shape of a partial or complete U, in the shape of a partial of complete V, or as a double straight strip, respectively as a double strip in the shape of a U or V, or even as combinations of these configurations.

Figure 5:
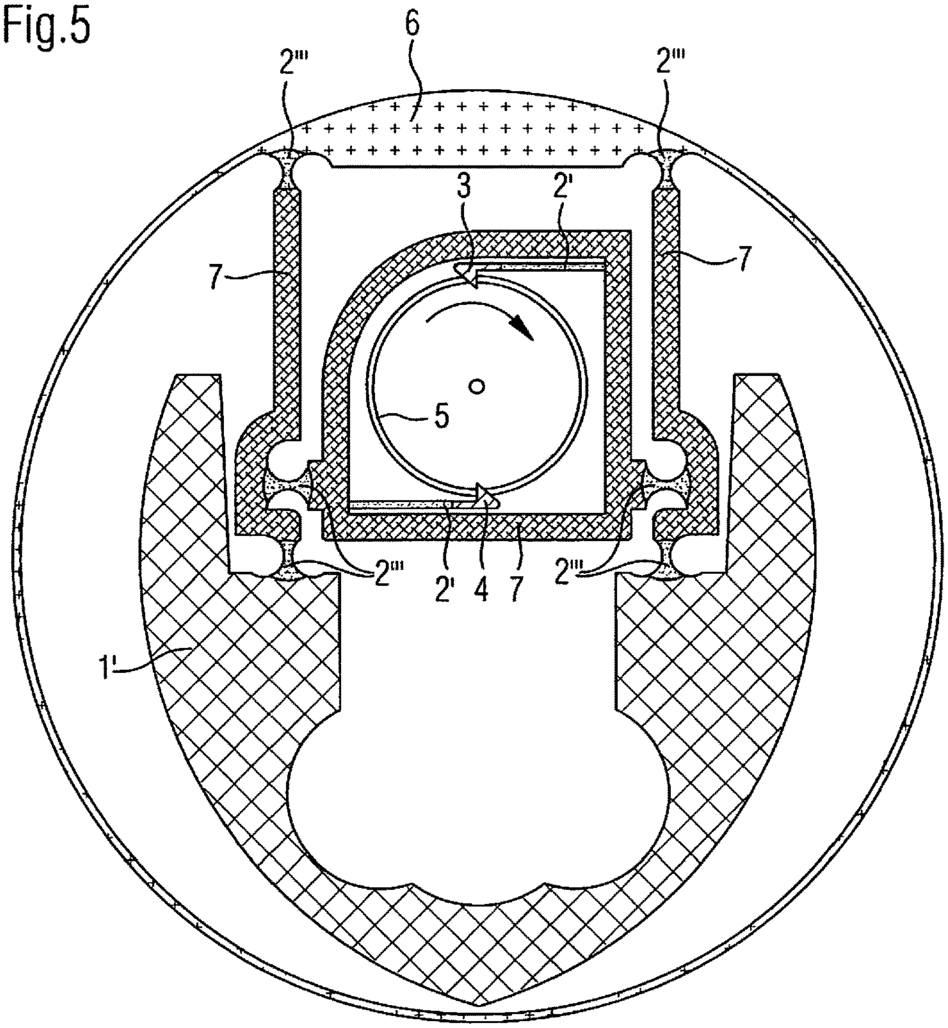
FIG. 5 shows an automatic winding mechanism comprising a monolithic component according to the present invention.

FIG. 5 shows a monolithic component constituting, along with the driven part, an automatic winding mechanism which adapted to be integrated into a timepiece. The reference numerals and graphics are the same as above, in particular in the context of FIG. 1. In contrast to the embodiments described above, this monolithic component is permanently fixed to an actuator formed by an oscillating mass 1', in a manner such that the actuator—monolithic component—driven part kinematic chain in this case can be produced by using only two physically separate parts, namely the monolithic component according to the present invention and the driven part. The oscillating mass 1' is connected to the frame 6 of the monolithic component via two flexible necks 2''', i.e., via two short parts having a constricted central portion allowing them to flex and therefore acting as a flexible strip. These two flexible necks 2''' are each integral with one end of a rigid intermediate portion 7 which is substantially straight in shape, each of the respective two intermediate portions being in turn connected at its other end to said frame 6 via a flexible neck 2'''. As a consequence, the oscillating mass 1' is connected to the frame 6 with the aid of two elastically flexible structures each comprising a rigid intermediate portion 7 with a substantially straight shape and two flexible necks 2''' which are integral with the ends of the rigid intermediate portion 7. The flexible necks 2''' are functionally equivalent to the flexible strips 2, 2' mentioned above, the term flexible "neck" being used here principally to emphasize that this structure is shorter and can thus be used to define a reduced amplitude of the corresponding movement compared with the movement defined by a flexible "strip" having a greater length. The frame 6 may comprise a bridge with a larger surface area which acts as a point of fixation for said two flexible necks 2''' linking the two intermediate portions 7 to the frame 6 as well as a peripheral portion with a substantially circular shape surrounding said oscillating mass 1' and the rigid intermediate portions 7.

Two other flexible necks 2''', preferably attached close to the respective ends of the two intermediate portions 7 which are integral with the oscillating mass 1', connect said two rigid intermediate portions 7 which are substantially straight in shape to a third rigid intermediate portion 7 which is substantially square in shape with a rounded angle. This third rigid intermediate portion 7 is located centrally between said two rigid intermediate portions 7 with a substantially straight shape arranged parallel to each other. The third rigid intermediate portion 7 surrounds an automatic winding wheel 5, which in this application of the monolithic component forms the driven part, and carries two flexible strips 2, 2' arranged tangentially with respect to said winding wheel 5. Each of the two flexible strips 2, 2' is terminated by a first rigid driving member 3, respectively by a second driving member 4, in particular by driving fingers 3, 4 in the form of hooks. As a consequence, each of the first and second rigid driving members 3, 4 is connected to the frame 6 with the aid of a respective first elastically flexible structure comprising two rigid intermediate portions 7 which are substantially straight in shape, a third rigid intermediate portion 7, four flexible necks 2''' which are integral with rigid intermediate portions 7 with a straight shape and, in part, with the third rigid intermediate portion 7, and a flexible strip 2, 2'. It should be noted in this context that each of these first elastically flexible structures, which are only distinguished by the flexible strip 2 or 2', forms an elbowed portion of approximately 90° in analogous manner to the explanations figuring above with respect to FIGS. 2*c* and 2*h*. This is possible in particular with the aid of flexible strips 2, 2' as well as the flexible strips formed by the flexible necks 2''', these portions of each first elastically flexible structure being separated by rigid intermediate portions 7 and orientated perpendicular to each other, in a manner such as to allow, respectively to considerably increase, the freedom of movement of the respective functional member 3, 4 in one of the directions of its displacement.

Thus, the rigid functional members in the form of driving fingers 3, 4 are adapted to engage with the teeth of the winding wheel 5 and both act, in alternation, as the driving finger when the mass 1' oscillates from left to right and vice versa and the two flexible strips 2, 2' carry out a corresponding movement. Thus, with the aid of the driving fingers 3, 4, with each oscillation with a sufficient amplitude of the oscillating mass 1', respectively with each sufficient movement of one of the two flexible strips 2, 2', the monolithic component drives the automatic winding wheel 5 in rotation, in a manner such that it turns by one or more step(s) in the direction of the arrow, depending on the amplitude of the oscillation of the oscillating mass 1'. It should also be noted in this context that the presence of the second rigid driving member 4 is optional in this monolithic component in order to increase the efficiency of the automatic winding, the monolithic component also being adapted to be used with only the first rigid driving member 3 being provided. The general operation of an automatic winding mechanism is also known to the person skilled in the art and consequently will not be described here in any more detail. In this application as well, the monolithic component described above allows to replace a series of at least twelve parts constituting an automatic winding mechanism, for example of the Pellaton type, of the prior art.

In general, the monolithic component according to the invention allows one to realize an automatic winding mechanism comprising a frame 6, a flexible structure and a driving member 3 comprising a driving means 34 which is adapted to cooperate with a driven member 5 of the mechanism, in this case an output mobile element. The driving means 34 constitutes a unidirectional drive device of the output mobile element. The flexible structure is positioned between the frame 6 and the driving member in a manner such as to make the driving means 34 mobile with respect to the frame along two degrees of freedom in a working plane which is that of the figure in the example of FIG. 5. The flexible structure may comprise rigid intermediate portions 7, as in the examples of FIGS. 2*c* and 2*h*.

At least one mass 1' is integral with the flexible structure. The mass may be added to or form part of the monolithic component as in the example represented in FIG. 5. The mass 1' is mobile with respect to the frame along at least one degree of freedom in the working plane. The elastic elements of the flexible structure return the mass towards a rest position in a manner such that the assembly they make constitutes an oscillator. The accelerations supplied to the timepiece cause the displacement of the mass the movement of which actuates the driving means 34 and, as a result, the driving member 5.

Many configurations are possible which contain these common characteristics. In particular, the mass may be mobile in rotation or along a plurality of degrees of freedom in the working plane.

Independently of the application in which the monolithic component is used, it may be produced from hardenable steel, preferably from Durnico steel. Furthermore, it may be machined by wire cutting, by die stamping, or by femto-printing which consists of modifying the physical properties and machining of transparent material using a femtosecond laser, followed by etching, but in all cases such that it extends in a single plane. Other techniques for the fabrication of a monolithic component of this type may be envisaged, for example Liga, 3D printing, and any fabrication process linked to silicon. Furthermore, the height of a monolithic component of this type is preferably in the range 0.1 mm to 5 mm and the width of the flexible strips of its first elastically flexible stricture is preferably in the range 5 μm to 1 mm, but these values may also be a little outside these ranges.

In light of the description figuring above of the principle of a monolithic component according to the present invention, of the options as regards its parts, as well as of two applications of a monolithic component of this type mentioned by way of example, it is clear that, on the one hand, this monolithic component can be realized in a multitude of embodiments which are arranged differently depending on the requirements of the specific horological application, and thus that it can be used in a considerable number of horological applications. On the other hand, as long as the monolithic component is arranged according to the principles mentioned above, and in particular in a manner such that said first elastically flexible structure linking the first rigid driving member to the rigid frame is configured in a manner such as to provide a displacement of said first driving member with at least two degrees of freedom, this monolithic component allows to obtain a number of important advantages. In fact, it allows to reduce the number of components constituting a complete mechanism or a functional sub-assembly of a corresponding timepiece, which simultaneously reduces the problems linked to friction and to play between these components, such as arbors or pinions, constituting a conventional horological mechanism. At the same time, because a single physical part is provided which is arranged in a single plane, this allows to more easily control the positioning and thus guarantee the reliability of the mechanism as well as to optimise the thickness of a respective horological component. This results in a transmission of energy by means of actuation along predefined trajectories having at least two degrees of freedom in the plane of movement, these trajectories possibly being simple or more complex and in various directions depending on the arrangement of the monolithic component, respectively of its flexible strips. In addition, monolithic components of this type may be produced using materials and fabrication techniques which are known in horological construction, and therefore at moderate cost, while also having an attractive aesthetic appearance in order to be adapted to be used in luxury watchmaking.

The invention claimed is:

1. A monolithic component for a mechanical timepiece, designed to transmit the movement of an actuator of the timepiece to provide a driving force to a driven part of the timepiece, said monolithic component comprising:

a rigid frame, a first rigid driving member, and a first elastically flexible structure connecting said frame to said first driving member, wherein said first elastically flexible structure is configured in a manner so as to provide a displacement of said first (hiving member with at least two degrees of freedom, said displacement being caused under the effect of the actuator.

2. The monolithic component according to claim 1, wherein the displacement is caused as a result of a contact of the first driving member with the driven part.

3. The monolithic component according to claim 1, wherein the displacement is caused as a result of a contact of the first driving member with a supplementary guide element.

4. The monolithic component according to claim 1, wherein said actuator is an independent part which is adapted to come into contact with said monolithic component in order to cause said displacement.

5. The monolithic component according to claim 1, wherein said actuator is integral with said monolithic component.

6. The monolithic component according to claim 1, wherein the components of said displacement with at least two degrees of freedom are selected from translations, rotations, movements according to a remote centre of compliance (RCC) and combinations thereof.

7. The monolithic component according to claim 1, wherein said first elastically flexible structure comprises two flexible strips each extending between said frame and said first driving member.

8. The monolithic component according to claim 7, wherein points of contact of the two flexible strips with the first driving member are arranged in different zones of said first driving member.

9. The monolithic component according to claim 7, wherein one of the two said flexible strips comprises an elbowed portion which is angled substantially at a right angle.

10. The monolithic component according to claim 1, wherein an intermediate rigid portion is arranged between two flexible portions of said first elastically flexible structure.

11. The monolithic component according to claim 1, wherein said first elastically flexible structure comprises one or more flexible necks arranged between two rigid elements of said monolithic component.

12. The monolithic component according to claim 1, further comprising a second functional member and a second elastically flexible structure connecting said frame to said second functional member, said second elastically flexible structure being configured in a manner such as to place said second functional member in contact with a driven part.

13. The monolithic component according to claim 1, further comprising a second function member, and wherein said driven part is a date disc or ring, the actuator is a control wheel equipped with a driving finger, said rigid first driving member is a yoke connected to the rigid frame via a first elastically flexible structure comprising flexible strips, and said second functional member is a jumper connected to the rigid frame via a second elastically flexible structure in a manner such that said monolithic component acts as a driving member and securing member of a date disc or ring of a date mechanism of the respective timepiece.

14. The monolithic component according to claim 1, wherein said driven part is an automatic winding wheel, the actuator is an oscillating mass integral with the monolithic component, and said rigid driving member comprises two driving fingers which are each connected to the rigid frame via the first elastically flexible structure comprising flexible strips as well as rigid intermediate portions and which both act in alternation as a driving mechanism which is adapted to drive said automatic winding wheel, in a manner such that said monolithic component acts as a driving member for the winding wheel of an automatic winding mechanism of the timepiece.

15. A mechanical timepiece, comprising the monolithic component according to claim 1.

* * * * *